United States Patent
Berg

(10) Patent No.: US 9,529,909 B2
(45) Date of Patent: *Dec. 27, 2016

(54) SYSTEM AND METHOD FOR CAREER WEBSITE OPTIMIZATION

(75) Inventor: Douglas M. Berg, Excelsior, MN (US)

(73) Assignee: SUCCESSFACTORS, INC., South San Francisco, CA (US)

( * ) Notice: Subject to any disclaimer, the term of this patent is extended or adjusted under 35 U.S.C. 154(b) by 3 days.

This patent is subject to a terminal disclaimer.

(21) Appl. No.: 13/591,598

(22) Filed: Aug. 22, 2012

(65) Prior Publication Data

US 2012/0317045 A1 Dec. 13, 2012

Related U.S. Application Data

(63) Continuation of application No. 12/109,966, filed on Apr. 25, 2008, now Pat. No. 8,271,473.

(60) Provisional application No. 60/946,095, filed on Jun. 25, 2007.

(51) Int. Cl.
*G06F 17/30* (2006.01)
*G06Q 30/02* (2012.01)

(52) U.S. Cl.
CPC ... *G06F 17/30864* (2013.01); *G06F 17/30336* (2013.01); *G06Q 30/02* (2013.01); *G06F 17/3005* (2013.01); *G06F 17/30769* (2013.01); *G06F 17/30973* (2013.01)

(58) Field of Classification Search
CPC ............ G06F 17/30864; G06F 17/3061; G06F 17/30616; G06F 17/30716; G06F 17/3082
USPC ................. 707/708, 706, 711, 715
See application file for complete search history.

(56) References Cited

U.S. PATENT DOCUMENTS

| | | | |
|---|---|---|---|
| 5,978,768 A * | 11/1999 | McGovern | G06Q 10/1053 705/321 |
| 6,363,376 B1 * | 3/2002 | Wiens | G06F 17/30864 |
| 6,523,021 B1 | 2/2003 | Monberg et al. | |
| 6,691,123 B1 * | 2/2004 | Gulliksen | G06F 17/30324 |
| 6,757,674 B2 * | 6/2004 | Wiens | G06F 17/30864 |
| 6,874,002 B1 * | 3/2005 | Peleus et al. | 707/812 |
| 6,904,407 B2 | 6/2005 | Ritzel | |
| 7,099,872 B2 * | 8/2006 | Carpenter | G06Q 30/02 707/710 |
| 7,505,919 B2 | 3/2009 | Richardson | |
| 7,587,395 B2 | 9/2009 | Harney et al. | |
| 7,676,515 B2 | 3/2010 | Hyder et al. | |
| 7,702,674 B2 * | 4/2010 | Hyder | G06Q 10/10 707/710 |
| 7,720,791 B2 | 5/2010 | Hyder et al. | |
| 7,720,862 B2 * | 5/2010 | Wu | G06N 5/022 707/780 |
| 7,797,181 B2 | 9/2010 | Vianello | |

(Continued)

FOREIGN PATENT DOCUMENTS

KR 20040098889 11/2004

*Primary Examiner* — Thanh-Ha Dang

(74) *Attorney, Agent, or Firm* — Fountainhead Law Group P.C.

(57) ABSTRACT

A method of managing career opportunities is provided. In some embodiments, a method for providing career and job listing websites and optimizing the career and job listing websites for search engine optimization is provided. In various embodiments, the method comprises creating a career website that mirrors a company's website, extracting job information from the company, and optimizing the job information for maximum search engine placement.

22 Claims, 10 Drawing Sheets

(56) References Cited

U.S. PATENT DOCUMENTS

| | | |
|---|---|---|
| 7,945,554 B2 | 5/2011 | Dedhia et al. |
| 7,974,986 B1* | 7/2011 | Toomey ............... G06Q 10/10 707/784 |
| 8,024,329 B1 | 9/2011 | Rennison |
| 2002/0065851 A1 | 5/2002 | Watson et al. |
| 2002/0072946 A1 | 6/2002 | Richardson |
| 2002/0087599 A1 | 7/2002 | Grant |
| 2002/0103789 A1 | 8/2002 | Turnbull et al. |
| 2002/0124056 A1* | 9/2002 | Dutta ................... H04L 29/06 709/218 |
| 2002/0194162 A1* | 12/2002 | Rios et al. ................ 707/3 |
| 2003/0036887 A1* | 2/2003 | Gibbs ............... A63B 24/0021 702/189 |
| 2003/0046389 A1 | 3/2003 | Thieme |
| 2003/0125970 A1 | 7/2003 | Mittal et al. |
| 2003/0177027 A1* | 9/2003 | DiMarco ............ G06Q 10/1053 705/321 |
| 2003/0182171 A1 | 9/2003 | Vianello |
| 2003/0187680 A1 | 10/2003 | Fujino et al. |
| 2004/0088283 A1* | 5/2004 | Lissar .............. G06F 17/30604 |
| 2004/0107112 A1 | 6/2004 | Cotter |
| 2004/0249801 A1* | 12/2004 | Kapur .............. G06F 17/30864 |
| 2005/0125395 A1* | 6/2005 | Boettiger ......... G06F 17/30864 |
| 2005/0125408 A1* | 6/2005 | Somaroo ......... G06F 17/30286 |
| 2005/0182770 A1 | 8/2005 | Rasmussen et al. |
| 2005/0198068 A1* | 9/2005 | Mukherjee ....... G06F 17/30864 |
| 2006/0155709 A1 | 7/2006 | Harlow |
| 2006/0161843 A1 | 7/2006 | Ebrahimi et al. |
| 2006/0195461 A1* | 8/2006 | Lo .................... G06F 17/30011 |
| 2006/0206448 A1 | 9/2006 | Hyder et al. |
| 2006/0206505 A1* | 9/2006 | Hyder .................. G06Q 10/10 |
| 2006/0206517 A1 | 9/2006 | Hyder et al. |
| 2006/0224729 A1 | 10/2006 | Rowe et al. |
| 2006/0229899 A1* | 10/2006 | Hyder .............. G06F 17/30873 705/1.1 |
| 2006/0242574 A1 | 10/2006 | Richardson et al. |
| 2006/0294074 A1* | 12/2006 | Chang ............. G06F 17/30864 |
| 2007/0033186 A1* | 2/2007 | Cinkle .................. G06Q 10/10 |
| 2007/0078850 A1 | 4/2007 | Aziz et al. |
| 2007/0100862 A1 | 5/2007 | Reddy et al. |
| 2007/0136256 A1 | 6/2007 | Kapur et al. |
| 2007/0150301 A1 | 6/2007 | McCall et al. |
| 2007/0150804 A1 | 6/2007 | Foulger et al. |
| 2007/0162323 A1* | 7/2007 | Gorham ........................ 705/9 |
| 2007/0198506 A1* | 8/2007 | Attaran Rezaei . G06F 17/30675 |
| 2007/0198727 A1 | 8/2007 | Guan |
| 2007/0203776 A1 | 8/2007 | Austin et al. |
| 2008/0059523 A1 | 3/2008 | Schmidt et al. |
| 2008/0065633 A1 | 3/2008 | Luo et al. |
| 2008/0071746 A1* | 3/2008 | Concordia et al. ............ 707/3 |
| 2008/0077556 A1 | 3/2008 | Muriente |
| 2008/0140710 A1 | 6/2008 | Dedhia et al. |
| 2008/0183585 A1 | 7/2008 | Vianello |
| 2008/0222144 A1 | 9/2008 | Backer et al. |
| 2009/0138450 A1 | 5/2009 | Richardson |
| 2009/0319518 A1 | 12/2009 | Koudas et al. |
| 2011/0231329 A1 | 9/2011 | Vianello |
| 2011/0231393 A1* | 9/2011 | Narasimhiah ........ G06Q 10/107 707/723 |

\* cited by examiner

| Term | Searchcount |
|---|---|
| Oracle Jobs | 1510 |
| Oracle DBA Jobs | 400 |
| Oracle 11i Jobs | 39 |

|    |               | 78    | 80    | 82    | 84    | 86    |
|----|---------------|-------|-------|-------|-------|-------|
| 70 | Title         | - KW1 | - KW2 | - KW3 | - KW4 | - KW5 |
| 72 | Filename      | - KW1 | - KW2 | - KW3 | - KW4 | - KW5 |
| 74 | Metadescrition| - KW1 | - KW2 | - KW3 | - KW4 | - KW5 |
| 76 | MetaKeyword   | - KW1 | - KW2 | - KW3 | - KW4 | - KW5 |

| | | | |
|---|---|---|---|
| ☐ | CERT OCCUP THER ASST | Yes | "CERT OCCUP THER ASST" | "Certified Occupational Therapy Assistant (COTA)" |
| ☐ | CERTIFIED MEDICAL ASST | Yes | "CERTIFIED MEDICAL ASST" | "Certified Medical Assistant (CMA)" |
| ☐ | Family Medicine | Yes | "PHYSICIAN FAMILY MEDICINE" | "Family Medicine Doctor/Practionier (Physician)" |
| ☐ | Internshipist | Yes | "Internshipist" | " " |
| ☐ | DIAG MEDICAL SONOGRAPHER | Yes | "DIAG MEDICAL SONOGRAPHER" | "Medical Diagnostic Sonographer (Ultrasound)" |
| ☐ | ONCOLOGIST | Yes | "ONCOLOGIST" | "Oncologist/Oncology" |
| ☐ | Physician Internal | Yes | "PHYSICIAN INTERNAL MED" | "Internal Medicine Doctor/Physician" |
| ☐ | CARDIAC REHAB SPEC EP | Yes | "CARDIAC REHAB SPEC EP" | "Cardiac Rehab Specialist" |
| ☐ | CARDIOPUL CLINICAL SUPV | Yes | "CARDIOPUL CLINICAL SUPV" | "Respiratory Care Supervisor (Cardiopulmonary)" |
| ☐ | CLINICAL DIR | Yes | "CLINICAL DIR" | "Clinical Manager (Nursing Manager/Director)" |
| ☐ | CLINICAL MGR | Yes | "CLINICAL MGR" | "Clinical Manager (Nursing Manager/Supervisor/Director)" |
| ☐ | CLINICAL NURSE SPEC | Yes | "CLINICAL NURSE SPEC" | "Clinical Nurse Specialist (CNS)" |
| ☐ | DRIVER MEDICAB HET | Yes | "DRIVER MEDICAB HET" | "Medical Transportation Driver" |
| ☐ | NURSING ASST | Yes | "NURSING ASST" | "Nursing Assistant (CNA)" |

FIG. 8

Client Rankings

| Client | Date | Start | End | Keyword | Rank/Page | Engine | |
|---|---|---|---|---|---|---|---|
| Any ▽ | Last Month ▽ | 2/1/2008 ▽ | 2/29/2008 ▽ | | 1 | Google ▽ | search |

63 Records Found

| Client | Date | Keyword | Word # | Google | Yahoo | MSN | Page |
|---|---|---|---|---|---|---|---|
| Xerox | 2/26/2008 | 🔍 Portland Oregon Software Engineering Jobs | 5 | 1 | 5 | 3 | 1 |
| Xerox | 2/26/2008 | 🔍 New York Outside Sales Jobs | 5 | 1 | 110 | 3 | 1 |
| Xerox | 2/26/2008 | 🔍 Rochester New York Siebel Jobs | 5 | 1 | 1 | 3 | 1 |
| Xerox | 2/26/2008 | 🔍 Portland Mechanical Design Jobs | 4 | 1 | 54 | 3 | 1 |
| Xerox | 2/26/2008 | 🔍 Rochester New York Architect Jobs | 5 | 1 | 38 | 3 | 1 |
| Xerox | 2/26/2008 | 🔍 Portland Test Engineer Jobs | 4 | 1 | 43 | - | 1 |
| Xerox | 2/26/2008 | 🔍 California Solutions Sales Jobs | 4 | 1 | 62 | 3 | 1 |

FIG. 10

SYSTEM AND METHOD FOR CAREER WEBSITE OPTIMIZATION

CROSS REFERENCE TO RELATED APPLICATIONS

The present application is a continuation of U.S. patent application Ser. No. 12/109,966, filed on Apr. 25, 2008, now U.S. Pat. No. 8,271,473, which claims priority to U.S. Provisional Patent Application Ser. No. 60/946,095, filed Jun. 25, 2007, each of which the contents of which are hereby incorporated by reference herein in their entirety.

FIELD OF THE INVENTION

The present invention relates to systems and methods for managing career opportunities and a system and method for developing a career website (or jobsite) and/or directing potential candidates to a company website, and more particularly to developing a career website and optimizing content of the career website for search engine placement.

BACKGROUND OF THE INVENTION

Current internet technologies for listing career opportunities or open job positions include, at least, listing available positions on a company's own website and/or listing the job for a fee on websites that specialize in posting job listings (i.e., job boards), such as Monster®, Careerbuilder®, HotJobs®, etc., or posting on other sites.

Potential candidates frequently use search engines (such as Google® or Yahoo®) to perform job related searches. Indeed, thousands of searches are performed daily to locate jobs. Companies (and job boards) are competing for candidate traffic from these major search engines to drive candidates to their posted jobs, whether posted on their own corporate website or on a website that specializes in posting job listings for a fee. Companies competing for candidate traffic to their career websites can use a "Pay-per-click" advertising option. Using pay-per-click advertising, a company pays for ads for their jobs to be displayed at the top of a search engine results. The company further pays for each user that clicks on each advertisement.

Companies that list job openings on their own websites typically struggle to drive traffic to their website. Often, the listings are invisible to search engine spiders for a variety of reasons, some of which are discussed below. At minimum, job listings on company web sites typically do not rank highly in organic search results. This is because, even when search engines can see the listings, the listings do not usually carry useful keywords in the areas that search engine spiders use to categorize and index a website, such as the page title, URL or file name, and metatags (keywords). Company websites further typically do not utilize strategic capabilities to help the search engines to index either their career site or specific online job pages.

There are several problems that often occur on company job sites that prevent search engines from correctly indexing the job sites. In most cases, the company website requires users to enter a keyword to initiate access to the job and does not provide direct links to online job listings (from the careers home page). Requiring key word entry before diversion to job listings prevents search engines from seeing and/or indexing the job content. Also, if a company's search results or job view page lead to a pop up window, the pop up window blocks search engines from seeing and/or indexing the job content. In addition, company websites frequently require people to register before getting access to the job content or search results. Requiring such registration also generally blocks search engines from seeing and/or indexing the job content. If company search results are displayed in a frame window (a web page within a web page), they are not accessed by search engines and, thus, search engines are blocked from seeing and/or indexing the job content.

Many of the issues that lead to blocking search engines from seeing and/or indexing job content are caused by companies using third party services such as Applicant Tracking Systems (ATS). ATS systems help companies manage their active job listings and process and manage applicants for each online job. When companies use third party services to host job content, the companies typically are required to use pop-up windows or frames in order to embed the third party content within the company's corporate site—or to link to it externally. Further, even if search engines were able to access the job content, most ATS systems are not built with search engine optimization architecture. Specifically, search engines give more weight to sites that have keywords in page titles, page names, meta keywords located in job type, meta data in the description including top searched keywords, company name, or location information. These parameters generally are not followed by ATS systems. Accordingly, even if a search engine is able to see and/or index the job content, the job is unlikely to be placed highly in organic search results.

Companies that use job boards to list their job openings have further challenges. A job board typically demands a fee for the service, which can be a deterrent for a company, especially when the company is considering multiple job boards. Additionally, job boards list available positions from competing companies, and in most cases, require candidates to register with the job board in order for them to apply to any specific position. This typically makes the candidates resume and contact information available to all companies who have access to the resume database. Accordingly, recruiters from competing companies can try to redirect applicants away from certain job listings or from the companies having positions for which they originally applied online. Also, in the past, millions of candidates have joined job boards using their resume and personal contact information which has resulted in a high level of unsolicited marketing contact (spam), along with major privacy breaches within even the most popular job boards. This has resulted in candidates avoiding this approach to job searching, and trying to use the major job boards to find company job postings directly using the major search engines. Traffic through job board websites can be significantly less than traffic through search engine websites, e.g., Google®, Yahoo®, etc.

If a company's career site and job content is correctly optimized for search engine indexing, the chances of the company's jobs and career site showing up in "organic" search engine results is enhanced without requiring fees for pay-to-click advertising or hosting on job board websites. However, teaching recruiters or managers to write job titles and descriptions with relevant keywords, and updating them periodically as keywords change, is typically not plausible, nor is it plausible to teach companies to insert HTML codes to optimize corporate job listings or websites. Thus, there is a need in the art for systems and methods to host career website content and to optimize the job postings for search engine placement, resulting in companies driving direct candidate traffic to their career website and job content online.

BRIEF SUMMARY OF THE INVENTION

Systems and methods for managing career opportunities, for developing a career website (or job website), and/or for directing potential candidates to a company website are provided. In some embodiments, system and methods for developing a career website and optimizing content (specifically targeted landing pages and job web pages) of the career website for optimum search engine placement are provided.

In one embodiment, a method for search engine optimization is provided. The method comprises establishing base information, creating a site, creating a category page on the site, and creating at least one keyword. The method further comprises associating the at least one keyword with the at least one category page and associating the base information with the at least one category page. At least one characteristic of the category page remains static regardless of the base information associated with it.

In another embodiment, a method for managing career opportunities is provided. The method comprises creating a job site, determining hiring goals, and creating a category page. The hiring goals include a location keyword and a skill keyword and the location keyword and the skill keyword are associated with the category page. The method further comprises creating a job listing page based on an available career opportunity and linking the job listing page to the category page. The location keyword and the skill keyword of the category page remain static regardless of the linked job listing page.

In yet a further embodiment, a method for managing career opportunities is provided. The method comprises creating a job site, determining hiring goals, and creating a category page. A subscribe button is provided on the category page. The hiring goal includes a location keyword and a skill keyword and the location keyword and the skill keyword are associated with the category page. The method further comprises creating a job listing page based on an available career opportunity and linking the job listing page to the category page. The job listing page includes an apply button. The location keyword and the skill keyword of the category page remain static regardless of the linked job listing page. The method further comprises tracking visitors to the job site and generating reports based on the visitors to the job site.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the drawings and detailed description are to be regarded as illustrative in nature and not restrictive.

BRIEF DESCRIPTION

Further objects, features and advantages of the invention will become apparent from the following detailed description taken in conjunction with the accompanying figures showing illustrative embodiments of the invention, in which:

FIG. 5 illustrates a keyword database in accordance with one embodiment;

FIG. 6 illustrates an architecture for a page in accordance with one embodiment;

FIG. 8 illustrates a renaming grid in accordance with one embodiment;

Figure 1:
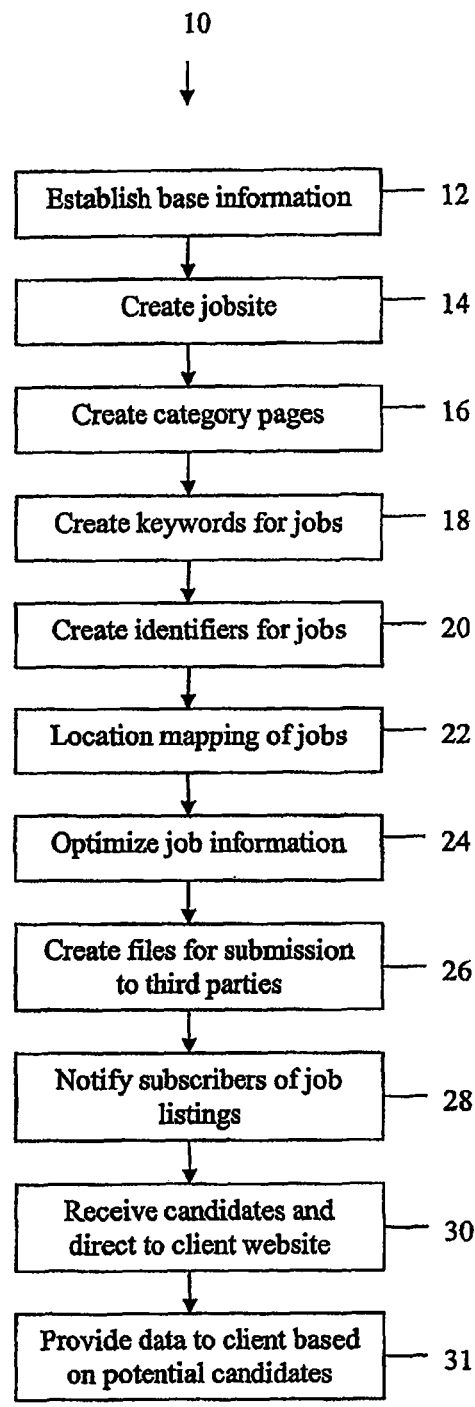
FIG. 1 illustrates an overview of a method for creating a jobsite in accordance with one embodiment.

FIG. 10 illustrates a marketing summary report in accordance with one embodiment; and Throughout the figures, the same reference numerals and characters, unless otherwise stated, are used to denote like features, elements, components, or portions of the illustrated embodiments. Moreover, while the present invention will now be described in detail with reference to the figures, it is done so in connection with the illustrative embodiments.

DETAILED DESCRIPTION

The present disclosure relates to systems and methods for managing career opportunities, for developing a career website (or jobsite), and/or for directing potential candidates (doing job related searches) to a company website, and more particularly to developing a career website and optimizing content of the career website for search engine placement Generally, in various embodiments, the systems and methods take base information relating to corporate jobs, create a category page or landing site for that base information, and optimize the information to the category page. When a candidate clicks on "apply" on page on the jobsite, a redirect URL may be used to direct the candidate back to the client's applicant tracking system to begin the apply process.

FIG. 1 illustrates a first embodiment of a method 10 for career site optimization. The system and method establishes information as base information for creating a job website [block 12]. Generally, the base information may be job listing or career information. The base information may be information presented on a client site (typically a company or corporate website). Alternatively, the base information may be information provided by a client. Further, the base information may be information conveyed to or gathered by the system in any suitable manner, such as by scraping.

As shown, a site (also referred to herein as a "jobsite") is created to present the base information [block 14]. In various embodiments, the site may be designed to substantially mimick a client site (such as one used as a source for the base information), as will be described more fully below. Category landing pages may be created based on the base information [block 16]. Keywords are created for the job listings or careers in the base information [block 18]. The base information may be scanned for establishing such keywords. Identifiers such as Job URLs, MetaKeywords, and Titles are created based on the base or job information [block 20]. Location mapping may further be performed on the base information [block 22]. Job optimization is performed for each job listed in the base information [block 24]. This may comprise, for example, using the keywords, identifiers, and mapped locations of blocks 18-22.

The system and method further facilitate exporting information. For example, information from the base information may be sent to third parties. Thus, as shown in FIG. 1, files for submission to third party sites may be created based on the base information [block 26]. These may comprise, for example, XML and RSS files. The system may also notify subscribers of job listings matching predefined criteria using email, RSS, or other communication needs.[block 28].

Candidates seeking to apply for a job may be received and diverted to the client website [block 30]. Additionally, the system and method may provide data to the client based on use of the system [block 31]. For example, a client may be provided with information regarding potential candidates.

As will be appreciated by one skilled in the art, not all of the steps of blocks 12-31 of FIG. 1 may be performed in various embodiments of the systems and methods described herein. Further, in some embodiments, additional steps may be performed.

Each of blocks 12 through 31 will be described more fully below.

Many companies have websites with career information and/or job postings. For the purposes of this disclosure, company career websites may be referred to as client sites. In some cases, these websites are only available internally. In other cases, these websites are available externally but are not "optimized". For example, many company career websites require keyword entry before diversion to job listings, provide search results in a pop-up window or frame, require registration, or other. Search engines do not follow links, pop-ups, or frames and, thus, search engines are substantially prevented from seeing and/or indexing the job content. Thus, a potential candidate searching for jobs using a search engine may not be directed to the company career website.

In accordance with some embodiments, the system and method described herein may be used to take information from the company career website and repackage it in an optimized manner such that potential candidates are directed to the client job listings on the job site. The system and method can further be used to direct the candidate back to the client site to apply for the job associated with the job listing.

Referring to block 12, any suitable method of gathering base information may be used. In some embodiments, the base information may relate to a specific job listing or career opportunity. In other embodiments, the base information may relate to a long-term hiring goal. In some embodiments, the base information may be provided through scraping a client website or may be provided by the client, for example in the form of a file. Scraping refers to a system that goes to the corporate site and performs the necessary searches to gather currently active jobs posted within the corporate system. Scraping may be performed routinely, such as daily The scraping system extracts the job file into a format that we can import and optimize for our purposes. Some companies utilize ATS systems for their career sites. In accordance with some embodiments, the ATS system thus may have a file and that file may be provided for establishing the job information. Thus, a preexisting job file may be used to obtain the base information. Alternatively, a company may provide base information directly or indirectly in any suitable manner.

Figure 2:
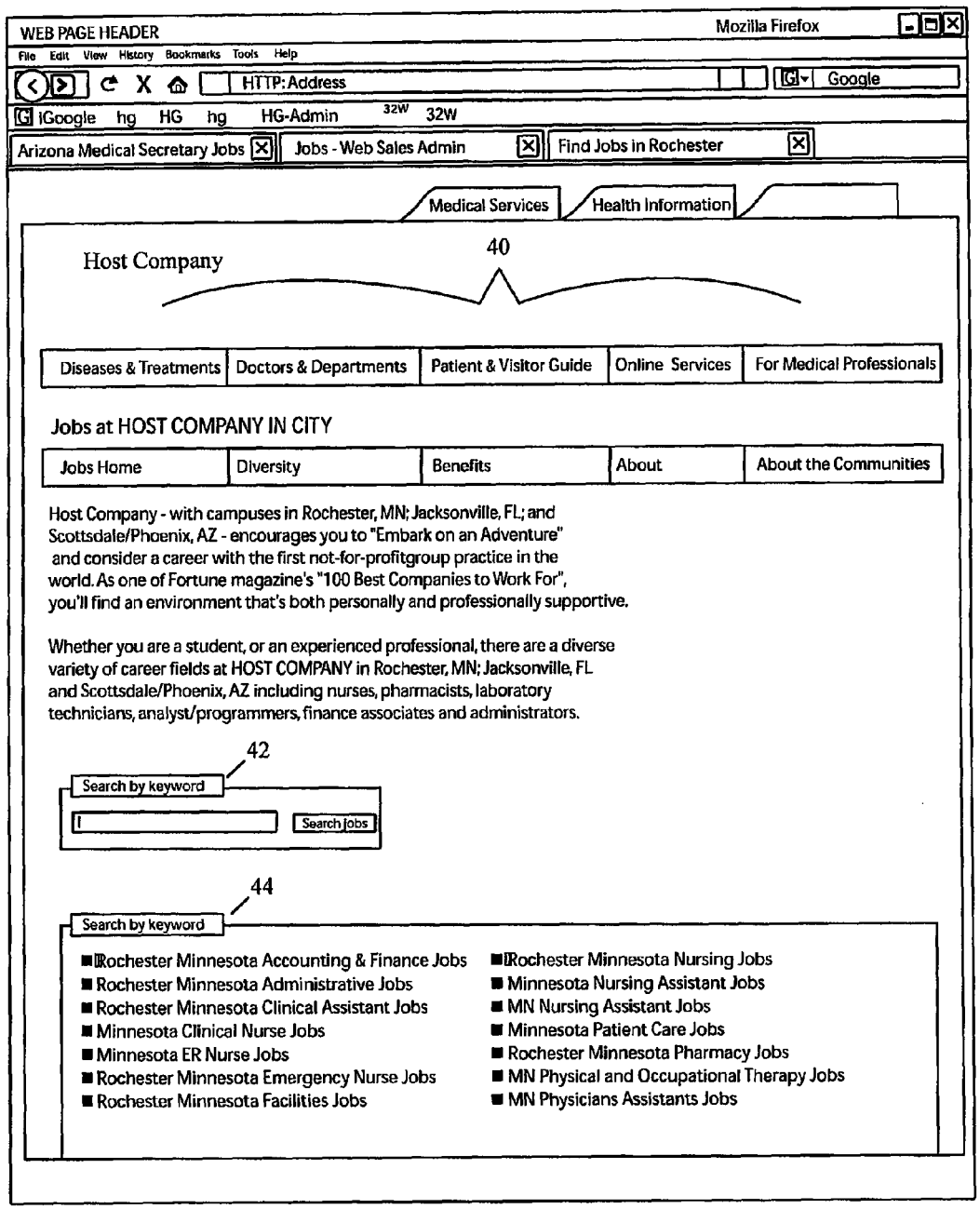
FIG. 2 illustrates a jobsite home page in accordance with one embodiment.

Referring to block 14, a site (which may be referred to herein as a "jobsite") is created to present job listing or career information from the client site. FIG. 2 illustrates a sample jobsite home page. As shown, the jobsite homepage may include client information 40, a search box 42, and a category pages listing 44. The client information 40 may be, for example, a client header or a client description and may facilitate perception by a potential candidate that the job site is associated with the client. Thus, the client header and client description may reflect the brand of the client, may contain content regarding employment at their company, and include links to their primary corporate website. The search box 42 provides functionality for candidate searching of jobs associated with the client. The category pages listing 44 may list the jobs according to geography, job category, or other as set on the category pages. Generally, the links may be targeted to specific category pages such as those containing Location and Occupation/Skill and Job keywords. The jobsite home page thus is itself optimized for indexing by search engines. In the embodiment shown, the category pages listing 44 lists jobs by geography and job category. A user may click on one of the job categories listed to go to a category page.

It is to be appreciated that once a jobsite is created, it is not necessary to create a new jobsite for posting of new jobs in an optimized manner. Further, in some embodiments, multiple jobsites may be created (described below). In accordance with some embodiments, the jobsite is created with headers, footers, style sheets, and/or other visual cues that correspond to a client site such that the jobsite has the look and feel of the client site. In some embodiments, the jobsite may substantially mimick or mirror a client site. Thus, in some embodiments, a potential candidate may not be aware that the jobsite is not the client's actual career site. Further, the jobsite may be designed such that navigation from the jobsite (e.g., through clicking on a job listing) may direct the potential candidate to the client site and, in some embodiments, directly to a job listing on a client site. Thus, the jobsite may operate substantially transparently.

Generally, the jobsite is created and optimized such that search engines direct traffic to the jobsite. A series of search engine optimized (SEO) categories may be created and potential candidates may view current job listings and/or subscribe for updates on future job listings. Because the site is optimized, as described, for search engines and classic job searching sites, the jobsite may place highly in organic placement based on keywords. Thus, a potential candidate using a search engine to search for jobs may receive the jobsite as a result. The potential candidate clicks through the results to arrive at the jobsite. The potential candidate can then click on "apply" on the jobsite and be directed to the client site to begin the apply process. Thus, the client site may have one or more hyperlinks to the client site. This enables using information and optimizing the information without altering the client site or navigating around client site firewalls.

In some embodiments, more than one jobsite may be created for a particular client. For example, a client may have an "engineer" jobsite, a "management" jobsite, and/or other jobsites. This permits the url to be optimized for searching. For example, keywords such as job skill or location may be included in the url. Alternatively, a client may have a single jobsite with trees to a plurality of job listings, such as to engineer job listings or management job listings.

Optimization of the jobsite is performed, for example, in blocks 16-24. Generally, base information is assessed and developed for optimization. In accordance with one embodiment, a keyword, job function, and/or zip code analysis system may be used to assess the base information (such as a job description or listing). In some embodiments, a rule based system may be used to rewrite a job function or description to have relevant keywords in the job title, metatags, header, text, etc., as described more fully below. The system may also add information such as zip codes, locations, or other data. Generally, jobs may be given keyword names to lead to high organic search placement. This can be done for multiple categories in any given job posting.

Figure 3:
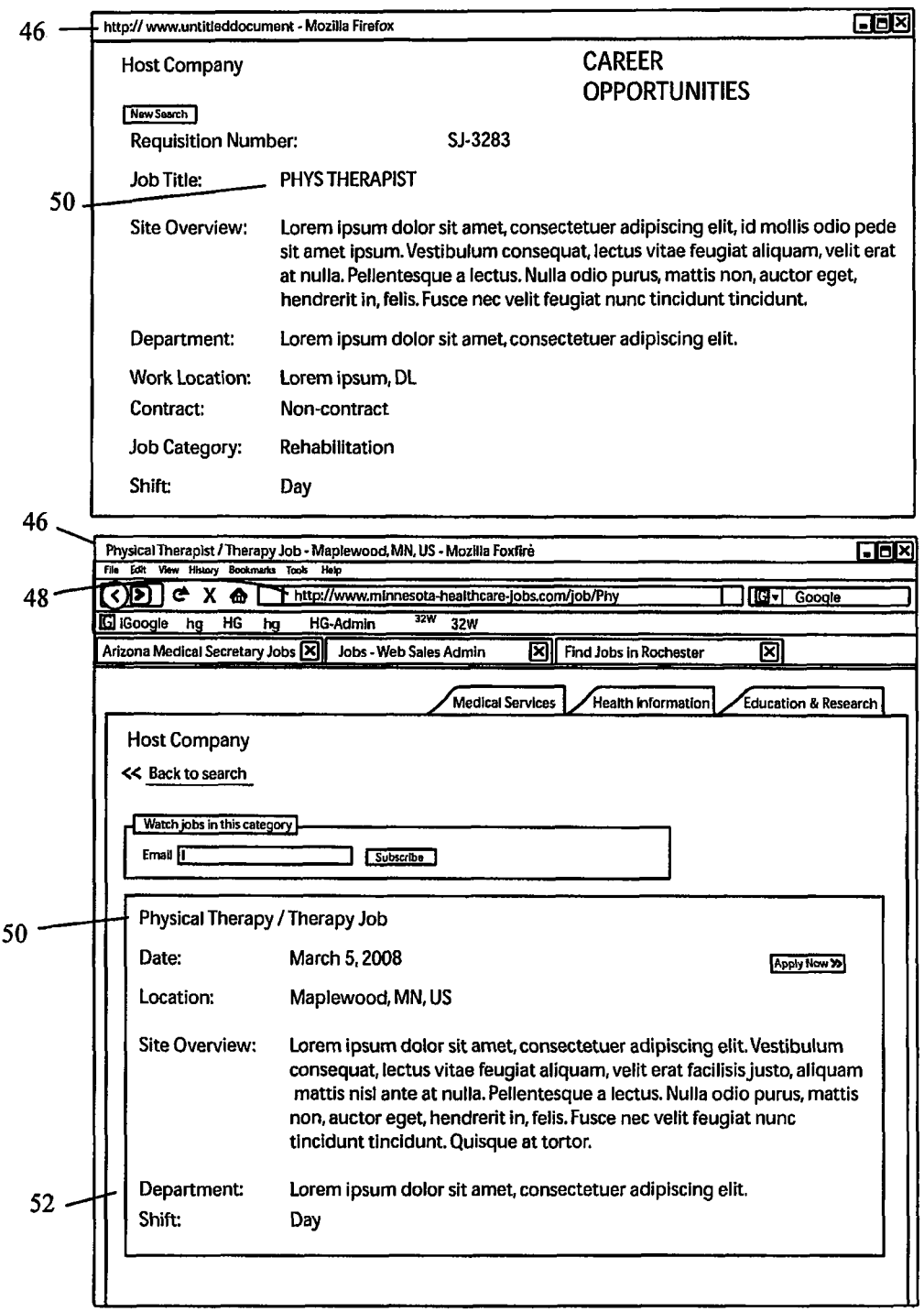
FIG. 3 illustrates a job optimization example in accordance with one embodiment.

FIG. 3 illustrates a job optimization example. Specifically, FIG. 3 illustrates a client site before job optimization and a jobsite after job optimization. Information such as Page Title 46, Filename/URL 48, Job Title 50, tagging of Job Title 50, MetaKeywords, and MetaDescription 52 may be optimized for search engine placement. As shown, the client site has a page title 46 including only a company name. The jobsite has a page title including the Job Title 50 and Location information. The client site does not have a filename and thus provides no keywords at this layer for indexing. The jobsite has a filename/URL 48 including Job Title 50 and Location information. The Job Title 50 on the client site is truncated to Phys Therapist. As can be appreciated, applicants do not typically search for truncated job titles. The Job Title 50 on the jobsite is translated to Physical Therapist/Therapy, both being frequently searched titles for the job. The Job Title 50 on the client site is not emphasized through tagging. The Job Title 50 on the jobsite is emphasized with a Header Tag (H1) and Bolded. On the client site, there are no MetaKeywords or MetaDescription 52 of the job. On the jobsite, MetaKeywords and MetaDescription 52 are provided containing Job Title and Location information.

Various methods for developing the optimized information and presentation of such information shown in FIG. 3 will now be described.

Referring to block 24, category pages may be created based on the base information. These may be referred to SEO categories, talent landing pages, or targeted recruitment category landing pages. A problem with achieving organic search placement for job listings on a company website stems from frequently changing hiring needs. Search engines tend to reward higher placement to pages that have been on the internet for a longer period of time and which are updated frequently. As can be appreciated, the job listings and/or job listing pages change to reflect changing job availability, job requirements, etc. Thus, job content may be online for a short period of time, for example only days or weeks. This substantially prevents the pages from having a lasting presence on search engines, and therefore does not provide sustained candidate traffic to the client site. Accordingly, as companies have new pages and/or listings for new job openings, they sacrifice search placement and traffic to their pages.

Creating category pages [block 24] thus may comprise determining long range hiring pages for a client and creating pages that may be on the internet for a long period of time and updated frequently, both being rewarded by search engines. Category pages thus may be aimed at the types of job functions and skills for which a client may hire. The pages may include the location names of each job function, and specific content within the pages that explain information specifically for this type of candidate desired by the hiring organization. The pages thus are structured with core information of the job: job title/occupation name, location (city/state/market name), skill or competency keywords, and salary or job/career related keywords such as "jobs", "careers", or "position". The category pages may be branded to the client or company and may contain specific content relevant to the career about which the page is focused.

The category pages may be designed to automatically display matching jobs for each category based on the data such as job title, location, skill, salary, etc., to provide candidates with relevant information within a single page— that remains indexed on the internet and within search engines for months or years, helping the client site to achieve higher search engine position over time.

Figure 4:
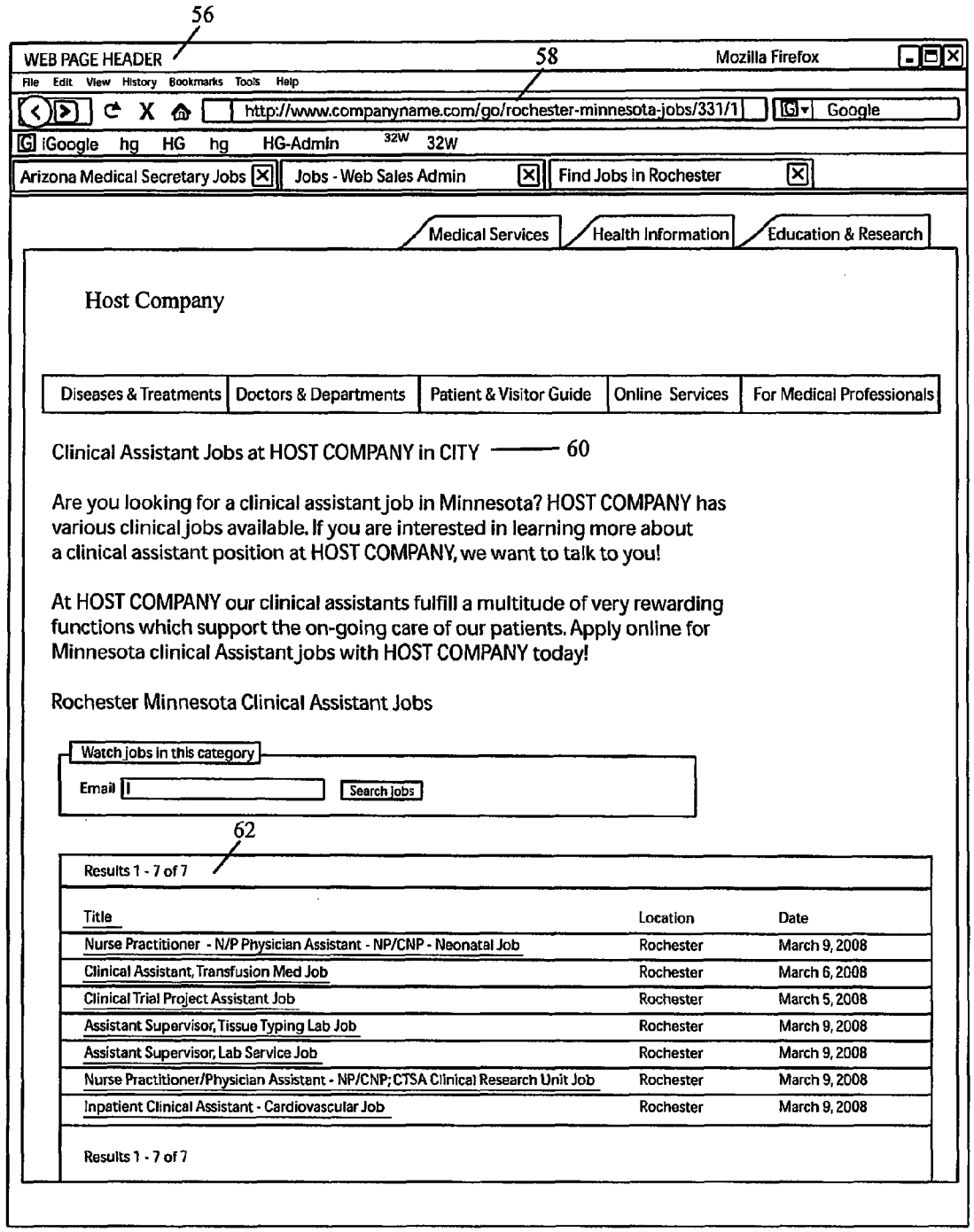
FIG. 4 illustrates a category page in accordance with one embodiment.

An example category page is shown at FIG. 4. As shown, the category page lists jobs relating to a job category in a specific location. In alternative embodiments, other parameters may be used for the category page. Upon prompting by a search of a user, the system and method may dynamically search job content on the jobsite and bring the user to a category page listing the matched jobs. Each job listing on the category page may link to a job listing page (shown and described with reference to FIG. 6) for that job listing.

Accordingly, in some embodiments, the category page includes core job information. Each job listing page similarly includes core job information. Job listing pages having the same core information as the category page are linked to the category page. The category page is configured to automatically display links to the job listing pages having the same core information.

Hidden keywords may be provided within the category page such that if a user subscribes to the client site, the user is tagged with the hidden keywords, such as the location and keyword. SEO categories may target online demographics of candidates for particular job openings, e.g., engineering, nursing, marketing, etc. SEO categories may exist even though no current job openings are available for that category. Thus, for example, a category page may exist for a certain location and occupation combination and, if no current job openings are available, the category page may state "No current listings." An applicant may view each category for job openings and may further subscribe to a category for updates regarding future job openings in that category by, for example, providing contact information. In one embodiment, an applicant may subscribe by providing an email address.

Category pages may include information such as location, job titles, targeted skills and the keywords "jobs" or "careers" or "salary". In the embodiment shown in FIG. 4, location, occupation, and the keyword "jobs" are embedded into the Page Title 56 of the web page. Location, Occupation, and the keywords "jobs" are embedded into the page URL or filename 58. Location, Occupation, and the keyword "jobs" are used in Header Tags (H1 tags) 60 and are bolded within the page. Jobs matching the location and occupation are then dynamically called into the category page 62 for the user.

Creating category pages 62 may include calling of jobs into the category pages, RSS feed creation (described with respect to block 26), and email matching and marketing (described with respect to block 30).

Block 18 of FIG. 1 relates to creation of keywords for the jobs. The base information may be scanned for establishing keywords for inclusion in the job listings of the jobsite. A rules based system may be employed to assess words in the base information against keywords that are used frequently on search engines. Further, the system may use internal language or language provided by a client to optimize the job description. Terms related to the internal language may be found and used in the job description. An interpretation layer may be developed and keyword research data used to optimize the job listing. The system may further change keywords in the description or listing to optimize the description or listing for searching. For example, the system may change a listing "engineer job" to "engineering job". These keywords may be embedded into the filename, title, meta keyword, within the page, or other.

Generally, search engines look at the number of keywords used on a page. Keyword spamming, or using more than ten keywords, typically results in the search engine ignoring the keywords. Thus, the system and method may select keywords for association with a job posting such that no more than ten keywords are used and such that these ten keywords are the most likely to be searched by a potential candidate. Accordingly, the system and method determines and/or establishes keywords to be used. One method of such determination is described with respect to FIG. 5. As shown in FIG. 5, in one embodiment, a database of keywords including a keyword category and subcategories for each keyword may be established. A heat index is set for each keyword wherein the heat index reflects the number of times potential candidates search using that keyword. FIG. 5 illustrates an example of three search term phrases and the search count for each search term phrase. Dynamic updating of the heat index may influence which keywords to associate with a job. Further, using the heat index, keywords previously associated with a job may be reassessed. The search count influences which keyword to use.

Referring to block 20 of FIG. 1, identifiers such as job URLs, meta keywords, and titles may be created and may include the keywords. As noted, search engines typically ignore keywords when more than ten keywords are used. Thus, to optimize search engine ranking of the page, fewer than ten keywords should be used. Further, search engines rank pages based on appearance and sequence of the keywords. For example, "Chicago audit jobs" may receive higher placement in search engine results than "audit jobs in Chicago" merely because the keywords are out of a search sequence that the search engines index on. Currently, search engines tend to rank job listings more highly when the listing comprises, in this order, location, occupation or skill name, and then career/job/salary. It is to be appreciated that the keywords listed and the order of their listing may change over time depending on the rankings given by search engines and that the system and method described herein may be applied to different keywords, ordering of keywords, number of keywords used (e.g., if search engines look at more than 10 keywords), and other as technology develops. Generally, in various embodiments, the system and method identifies or creates keywords (block 18), creates identifiers for the job listing (block 20), and creates a keyword sequence for the keywords to be used in the identifiers. This may be embedded in a grid table elements.

FIG. 6 illustrates sample architecture for a page with grid table elements. As shown, a page can have several identifiers such as Title 70, Filename 72, Metadescription 74, and Meta-keyword 76. Keywords may be associated with each of these identifiers. In the embodiment of FIG. 6, five keywords 78, 80, 82, 84, and 86 are associated with each of these identifiers. The search engine rates the page based on the keywords associated with the identifiers. For optimized rating, the same keywords may be placed in the same order for each identifier. Thus, as shown, each of the keywords 78, 80, 82, 84, and 86 appear in the same order after each of the identifiers, Title 70, Filename 72, Metadescription 74, and Meta-keyword 76. The keyword farthest to the left, 78, is identified by the search engine as the first keyword.

Figure 7:
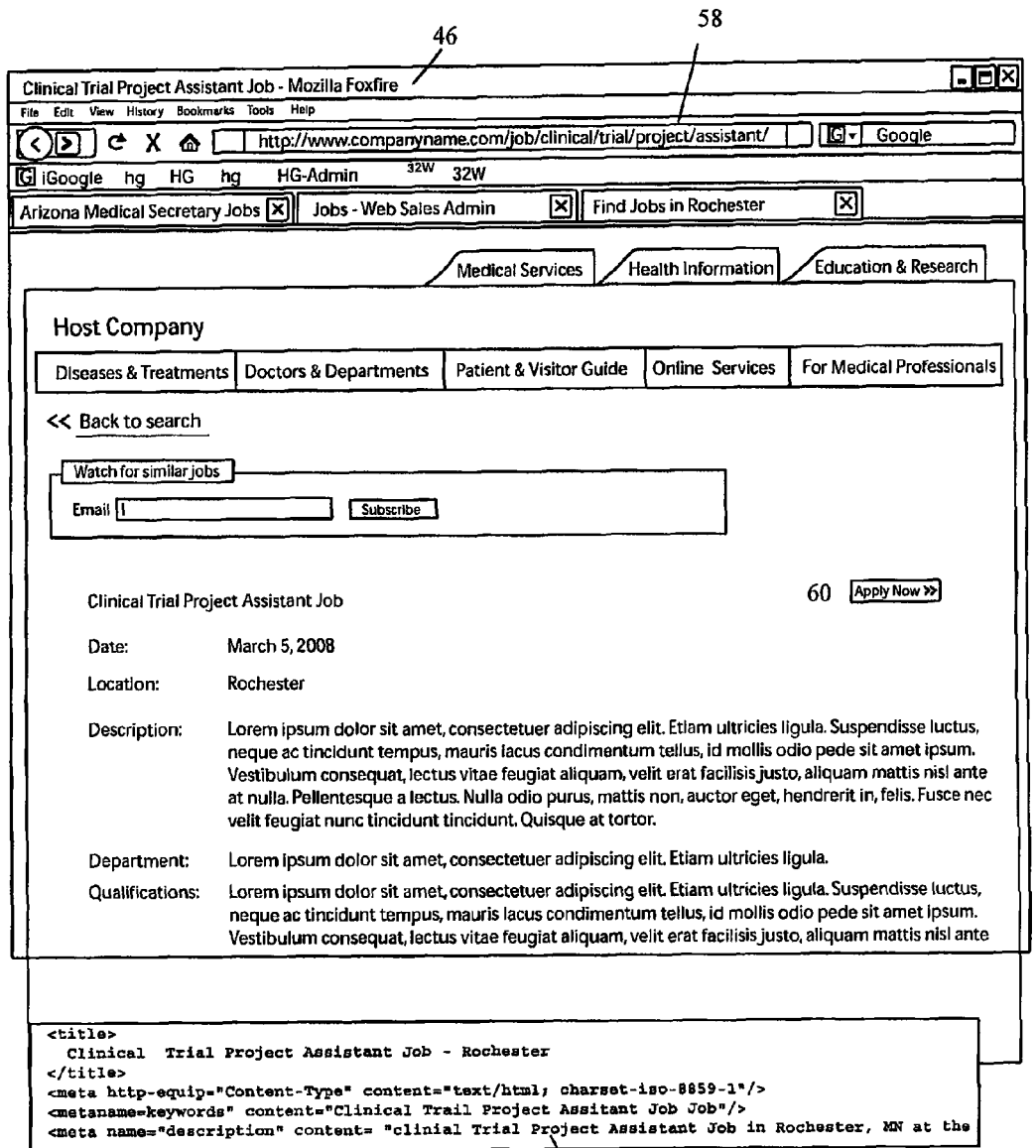
FIG. 7 illustrates a job listing page in accordance with one embodiment.

As noted, each job listing on the category page may link to a job listing page for that job listing. FIG. 7 illustrates such job listing page. In the embodiment shown, the job listing page includes a client header, a subscription box, a job description, and an apply feature. The subscription box enables a potential candidate to enter contact information to be contacted when similar jobs are posted. The job description includes a Title, a Date Posted, a Location, and a Position Description. In various embodiments, more or less data about the job may be posted. Several descriptors on the page may be optimized for search engines. Job Title keywords may be automatically embedded into the Page Title 46 of the web page based on the search engine optimized title. Job Title keywords may be automatically embedded into the URL File Name 52 of the web page. Job Title keywords may be automatically put into Header Tags (H1) 60 and bolded on the web page. Job Title keywords may be automatically put into MetaKeywords in the source code of the web page and/or the MetaDescription 52 of the web page.

By clicking the apply feature, the potential candidate is directed towards an application page. The application may be on the client site such that, upon selection of the apply feature, the potential candidate is navigated to the client site. Such navigation may include directing the potential candidate directly to the job as listed on the client site, to a career index on the client site, or to a home page of the client site. In alternative embodiments, the potential candidate may apply on the jobsite Returning to FIG. 1, block 22 relates to location mapping of jobs. Location mapping may be performed on the base information. Such location mapping facilitates searching. Actual location of jobs is becoming increasingly important as more jobs are listed on the web and a generic search based on a broad location provides too many hits. The system and method thus may scan the base information and look for state abbreviations, state names, city names, county names, and or zip code information to determine specific location information to be included in the job information. If the base information does not include, for example, a zip code or area code, location information such as zip code or state may be attributed based on other information in the base information. For example, the system and method may include a client facility index for a particular client and, if the base information includes facility information, the client facility index may be referenced to determine actual location of the job.

In various embodiments, additional optimization steps may be performed. Further, in some embodiments, some of the listed steps may not be performed. Thus, block 24 refers to job optimization for each job listed in the base information. Job optimization may comprise rules mapping to rename job titles and/or augmenting the job information with content to enhance search results. For example, a client site may have a listing for the title Electrical Engr. A potential candidate, however, is more likely to search for an "Electrical Engineer" than an "Electrical Engr." Thus, the system and method may rename the job listing to "Electrical Engineer." Further, alternate titles may be added in the content area of the job. One method for renaming job titles is described with respect to FIG. 8.

FIG. 8 illustrates a renaming grid. A first column lists a name of the renaming rule. A second column lists the job title or keyword associated with the job content that is being renamed. The third column lists the new keyword and/or code that is used to replace the job title or keyword. The renaming grid may change terminology, for example expanding a truncated job title. Additionally, the renaming grid may change formatting, for example putting bold tags around the keyword or doing other formatting to optimize the formatting.

The job information thus may be optimized so that the information is recognized by search engines, including the major search engines, such as Google®, Yahoo®, Lycos®, etc. As previously noted, the job information may also be submitted to the search engines, job sites or job boards, and in some embodiments, submitted to free job sites or job boards, such as Google Base®, Simply Hired®, Indeed.com®, Craigslist®, etc. Accordingly, active job listings may written to a site map (a site map is a list of active web pages within a website that assists the search engines with indexing the content within the site). The site map may be submitted to major search engines on a regular basis, for example, every day. In accordance with one embodiment, several "job feeds" or files may be created for delivery to several different search systems or job sites based on the xml file requirements used by each search system or job site. This enables the search system or job site to more easily index the job description. In one embodiment, the job listing may be submitted to organic search sites and free job sites.

Referring to block 26 of FIG. 1, files including the optimized job information may be created for submission to third parties. A list of active jobs, along with the full description for each job, is created into a file (job feed) for third parties. The third parties can extract the job content and import into their websites. The third parties are typically free job sites. This also facilitates direction of potential candidates to the job site and/or the client site. Currently, websites are available that post jobs on their site. Thus, job feeds may be submitted to the websites. For example, a job feed may be submitted to any job aggregator (free job posting sites or job search sites). Further, aggregators are available that search major career sites but do not post jobs on their site. Aggregators use a "feed" that generates a link to the job posting. This feed may include a link to the job site or the to client site. The feed may be an RSS feed (simple syndication) created based on a category. The feed is optimized by including the keywords, etc. described with respect to blocks 12-24 of FIG. 1.

The system and method may further be used to actively market to potential candidates and/or to provide further data to clients.

Block 28 of FIG. 1 relates to active marketing. A potential candidate may register with the system to be notified of jobs of specific categories, as noted above. The system may then match jobs to the subscriber based on, for example, location, category, and/or keyword. The system may then notify the subscriber of the job via email or other communication means. As noted, hidden keywords may be provided within the category page such that if a user subscribes to the client site, the user is tagged with the hidden keywords, such as the location and keyword. Thus, merely by clicking a button on the jobsite, a user is matched to specific categories of jobs based on the page from which the user subscribed. Thus, for example, the button for clicking may read "Notify me of similar job listings." Further, a user may subscribe through the client site (after, for example, clicking through the jobsite to the client site). A client may have an embedded API (Application Protocol Interface) on the client's own career site which would allow them to gather subscribers directly from their own career site in addition to the jobsite. In alternative embodiments, a subscribe button may be provided where the user is directed to a form for filling out information about jobs they would like to be notified of. Regardless of manner of and type of subscription, the user may further be provided with subscription management and category management tools so that they can discontinue receiving mail messages from any particular jobsite.

After a user subscribes, the system and method matches new job postings with the subscribed user and sends information to the user about new job postings. Such information may be sent on a timed basis, for example a weekly job update, or on a listing basis, such as every time a relevant job is posted, or other. The system and method may develop a custom message for each user. For example, the system and method may maintain an index or database of previous applicants. In some cases, the client may provide the database of people who have applied. The system and method thus can send a different job notification message to a subscriber who has previously applied than to a subscriber who has not. For example, a notification to someone who has previously applied may say: "You have applied to us in the past. Here are similar jobs for which you may want to consider applying." Further, job notifications may be sent to employees of a client. This type of notification may be referred to as an employee referral notification. A notification may thus be sent to an employee in a certain category listing available jobs and explaining that they may be eligible for a referral bonus if someone applies for it. Thus, the system and method provides recruitment marketing customization.

Block 30 of FIG. 1 illustrates receiving candidates and directing the candidates to the client site. From a job listing on the jobsite, a candidate may select to apply for the job. Such selection may comprise, for example, clicking a button that says "Apply now." The button can link directly linked to the client site. In some embodiments, the candidate is linked directly to an application page for that job. Alternatively, the candidate may be linked to a job listing for that job from which the candidate can then choose to apply. Such direct linking is facilitated by tagging the "Apply now" button. Alternatively, a candidate may simply be sent to the client site where the candidate has to search for the client job posting. Generally, in various embodiments, the systems and methods creates a jobsite, take base information, create a category page or landing site on the jobsite for that base information, and optimize the information to the category page. When a candidate selects to apply for a job from a job listing on the jobsite, a redirect URL may be used to direct the candidate back to the client site. The redirect URL may also be optimized with parameters. These parameters may contain, for example, the exact job for which the applicant is applying and includes the source code of where the candidate arrived to the site from. This directs the candidate specifically to the job posting or apply page for that job on the client site. The source tag, along with ATS systems, may indicate where the candidate came from. This information can be used to assess what sources are driving the traffic to facilitate optimization of job posting for usability and source tracking.

Accordingly, block 30 of FIG. 1 relates to providing information to a client. The client may be given information regarding the source of potential candidates based on IIS, cookies, keywords, etc. This may be done, for example, by setting hidden tags in the ATS systems. Information relating to the exact search terms used to drive traffic to the job site and the ranking history of their specific job category pages on major search engines may be provided to the client.

Thus, traffic reports and other statistical reports may be created and provided to the company so that the company can manage the value of the mirror site. For example, a company may be able to track and manage the applicants who subscribe to the company's listings and/or SEO categories. Furthermore, a company may be able to track the number of visitors, the number of click throughs, the number of applicants who have applied for each listing, etc. Other site statistics, such as but not limited to, SEO and mirror site page rankings for a particular search engine may further be provided.

Figure 9:
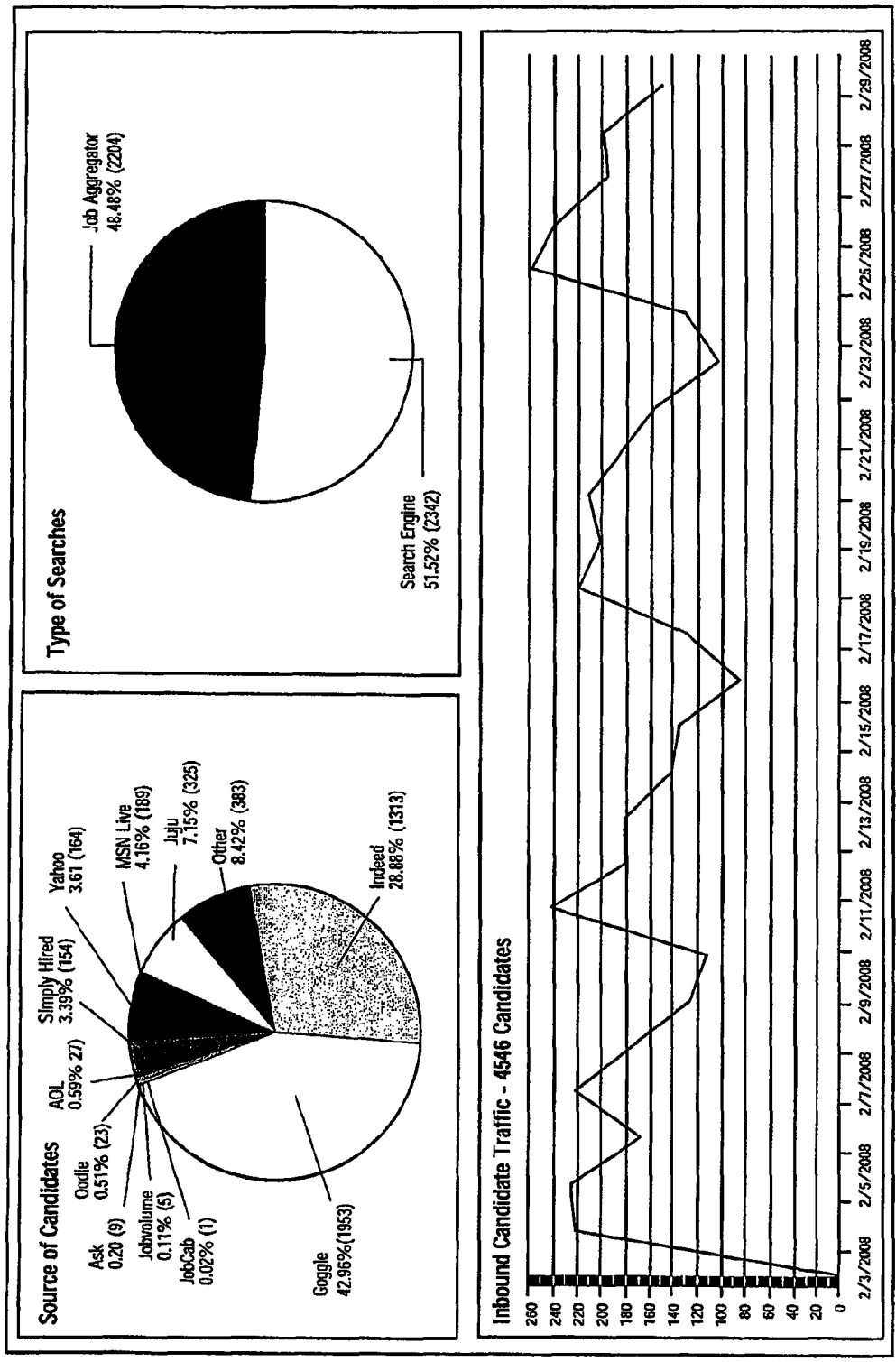
FIG. 9 illustrates an executive overview report in accordance with one embodiment.

More specifically, because traffic is driven to the jobsite, analytics may be done on the search results. All of the traffic driven to the jobsite (organic traffic, pay-per-click—if done) may be analyzed. Reports may be generated showing new versus returning visitors, where visitors are coming from geographically, top keywords, where sources come in from, placement location with certain categories, or other. Analysis may be done of where visitors click from the job posting—benefits, apply, etc. Analysis may be done of how many people clicked on the apply button and, of those, how many people applied. Reports may be generated on a daily basis, weekly basis, monthly basis, real time, or other. FIGS. 9 and 10 illustrate reports based on traffic to the jobsite. FIG. 9 illustrates an exemplary executive overview including visits and pageviews, a map overlay, visits by new and returning users, and visits by source. FIG. 10 illustrates an exemplary marketing summary showing top five sources, top five keywords, and top five campaigns. Alternative reports may be generated based on traffic to the jobsite.

Search keywords and/or referring source used by potential candidates may further be extracted. In one embodiment, the method further includes automatically extracting the search keywords and referring source of a candidate to the jobsite. This information is captured and may be provided to the client via reports such as described above or via their ATS system. The system and method, or the client, may use the information to determine which referring sources are providing the most traffic, and to learn what keywords and referring sources are driving traffic to the jobsite. The jobsite may be dynamically updated based on such information.

EXAMPLE OPTIMIZATION AND USE. As can be seen in the illustration below, in one embodiment, the jobsite may be populated with job information, including available job openings. This job information may be extracted from the client site or may be provided by the company in any other format. The job information may be extracted or otherwise received from the company at any time or at any periodic rate, such as daily, weekly, etc.

Potential candidates may search for available job openings through use of a search engine, such as any of the major search engines that are known in the art. In this manner, search results may contain links to the job openings in an area of the search results that is free of cost to the company, e.g., the organic search results. Therefore, there is no need for companies to pay for keyword advertisements to direct candidates to their career site, thereby saving the company extra costs, particularly where a company would otherwise need to pay multiple search engines for a listing.

In some embodiments, the job listing optimization may be supplemented with a pay-per-click campaign. Search strategies employed by potential candidates typically comprise several words, such as job title, location, and job-related keyword (e.g., Chicago nursing jobs). Such search strategy may be referred to as a "long tail" keyword search. Generally, as described above, the jobsite may include category pages optimized for long tail keywords. Some search strategies, however, comprise extremely competitive keyword search strategies including, for example, only a job title and location or only a job title and job-related keyword. Such search strategy may be referred to as a "short tail" keyword search. Short tail keywords (e.g., nursing jobs) are extremely competitive. In some embodiments, the job category pages may be optimized for a competitive keyword search including a skill or a geographic keyword (e.g., Chicago nursing jobs). The optimized listing is then supplemented with a pay-per-click campaign on the competitive short tail keyword to gain candidate traffic until such time that organic listings product the desired results for any client site.

A user search on a search engine may result in the user being driven to a jobsite home page, such as shown in FIG. 2. The user is thus provided with links to category pages matching their searched parameters. In some embodiments, the user may be directed to a category page, such as shown in FIG. 4, or a job listing page, such as shown in FIG. 7, from the search engine.

The category pages listing lists jobs according to geography, job category, or other as set on the category pages. The user may click on one of the job categories listed to go to a category page.

The category page, an example of which is shown in FIG. 3, may list available jobs of that category. For example, available jobs of a certain type at a certain location. A user can select a job listing to be directed to a job listing page. Such selection may be, for example, by clicking on the job listing.

The job listing page, an example of which is shown in FIG. 7, gives specifics relating to that job listing. The user may be given the option of applying for the job from the job listing page. Clicking on an apply button can direct the user to a client site or may direct the user to another application page.

Each of the jobsite, the category page, or the job listing page may provide the user with the option of subscribing for notifications of job listings.

Although the present invention has been described with reference to preferred embodiments, persons skilled in the art will recognize that changes may be made in form and detail without departing from the spirit and scope of the invention.

What is claimed is:

1. A computer implemented method for search engine optimization of career listings on a network, the method comprising:
   establishing base information from a first job listing hosted on a company website;
   determining a first keyword and a second keyword for a second job listing based on the base information;
   generating a keyword sequence by ordering the first keyword and the second keyword according to a predefined search sequence;
   creating a job listing page for the second job listing that includes the keyword sequence;
   creating a job website for display over a network, the job website including a network link to the job listing page;
   transmitting to a search engine a site map comprising the job listing page in order for the search engine to index the second job listing in the job listing page based on the keyword sequence; and
   displaying the job website over the network to an end user visitor in response to a request received from the end user visitor through a network link to the job website provided by the search engine based on the indexed second job listing.

2. The computer implemented method of claim 1, wherein establishing base information comprises scraping the company website.

3. The computer implemented method of claim 1, wherein determining the first keyword and the second keyword comprises:
   scanning the base information for potential keywords; and comparing the potential keywords against a database of keywords frequently used as part of a query for the search engine to select the first keyword and the second keyword.

4. The computer implemented method of claim 3, wherein comparing the potential keywords against the database of keywords comprises applying a rules-based algorithm to assess the potential keywords from the base information against the database of keywords.

5. The computer implemented method of claim 4 further comprising maintaining a heat index for each of the keywords in the database of keywords, the heat index reflecting the frequency in which a keyword appears in job searches.

6. The computer implemented method of claim 5 further comprising dynamically updating the heat indices for the keywords and reassessing the determined plurality of keywords for the career.

7. The computer implemented method of claim 1, wherein determining a plurality of keywords for the career based on the base information comprises renaming one or more potential keywords from the base information using a renaming database.

8. The computer implemented method of claim 1 further comprising creating an identifier for the job listing page and populating the identifier with the keyword sequence.

9. The computer implemented method of claim 8, wherein the identifier comprises at least one of a title for the job listing page, a filename for the job listing page, a metadescription for the job listing page, a meta-keyword for the job listing page, and a uniform resource locator (URL) for the job listing page.

10. The computer implemented method of claim 1 further comprising creating an identifier for the job category webpage and populating the identifier with the plurality of keywords in the keyword sequence, the identifier comprising at least one of a title for the job category webpage, a filename for the job category webpage, a metadescription for the job category webpage, a meta-keyword for the job category webpage, and a uniform resource locator (URL) for the job category webpage.

11. The computer-implemented method of claim 1 further comprising:
assigning a hidden keyword to the job listing page.

12. The computer-implemented method of claim 11 further comprising:
tagging a user with the hidden keyword when the user subscribes to the job listing page.

13. The computer-implemented method of claim 12 further comprising:
periodically transmitting an update on job openings to the user when the user is tagged with the hidden keyword.

14. The computer-implemented method of claim 1, wherein the second job listing further includes a network link for navigating to the first job listing hosted on the company website, the computer-implemented method further comprising:
receiving from the end user visitor a selection of the network link; and
in response to receiving the selection, redirecting the end user visitor to the first job listing hosted on the company website.

15. A computer implemented method for search engine optimization of career listings on a network, the method comprising:
establishing base information from a plurality of job listings hosted on a company website;
creating a job listing page for each of the plurality of job listings based on the base information;
determining a first keyword and a second keyword for the plurality of job listings based on the base information;
generating a keyword sequence by ordering the first keyword and the second keyword according to a predefined search sequence;
creating a job category webpage and associating the job category webpage with the keyword sequence;
linking at least one of the job listing pages to the job category webpage;
creating a job website for display over a network including the job category webpage;
transmitting to a search engine a site map comprising the job category page in order for the search engine to index the at least one of the job listings in the job category page based on the keyword sequence; and
displaying the job website over the network to an end user visitor in response to a request received from the end user visitor through a network link to the job website provided by the search engine based on the indexed at least one of the job listings.

16. The computer implemented method of claim 15 further comprising creating a plurality of job category webpages, wherein each of job category pages is associated with a plurality of keywords in a keyword sequence, wherein the plurality of keywords is based on the base information, wherein the job website comprises each of the job category webpages.

17. The computer implemented method of claim 16, wherein the job website comprises a category page identifying the plurality of job category webpages.

18. The computer implemented method of claim 15, wherein establishing base information comprises scraping the company website.

19. The computer implemented method of claim 15, wherein determining the first keyword and the second keyword comprises:
scanning the base information for potential keywords; and
comparing the potential keywords against a database of keywords frequently used as part of a query for the search engine to select the first keyword and the second keyword.

20. The computer implemented method of claim 19, wherein scanning the base information for potential keywords and comparing the potential keywords against a database of keywords comprises applying a rules-based algorithm to assess the potential keywords from the base information against a database of keywords.

21. The computer implemented method of claim 20 further comprising maintaining a heat index for each of the keywords in the database of, the heat index reflecting the frequency in which the first keyword appears in job searches.

22. The computer-implemented method of claim 15, wherein each job listing page of the at least one of the job listing pages includes a network link for navigating to a corresponding job listing in the plurality of job listings hosted on the company website, the computer-implemented method further comprising:
receiving from the end user visitor a selection of the network link of a particular job listing page of the at least one job listing pages; and
in response to receiving the selection, redirecting the end user visitor to the corresponding job listing hosted on the company website.

* * * * *